US006343620B1

(12) United States Patent
LeDevehat et al.

(10) Patent No.: US 6,343,620 B1
(45) Date of Patent: Feb. 5, 2002

(54) ARTICULATED DEVICE FOR TRANSFERRING FLUID AND A LOADING CRANE INCLUDING SUCH A DEVICE

(75) Inventors: Eugene LeDevehat, Saligny; Renaud LeDevehat, Sens, both of (FR)

(73) Assignee: FMC Corporation, Chicago, IL (US)

( * ) Notice: Subject to any disclaimer, the term of this patent is extended or adjusted under 35 U.S.C. 154(b) by 0 days.

(21) Appl. No.: 09/563,966

(22) Filed: May 3, 2000

(30) Foreign Application Priority Data

May 3, 1999 (FR) .......................................... 99 05607

(51) Int. Cl.[7] .............................. B65B 1/04; F16L 3/00
(52) U.S. Cl. ....................................... 137/615; 417/387
(58) Field of Search ................................ 137/615, 899; 141/387, 388

(56) References Cited

U.S. PATENT DOCUMENTS 4,090,538 A * 5/1978 Kotcharian ............. 137/615 X
4,180,170 A * 12/1979 Meinken ................. 137/615 X
4,376,452 A 3/1983 Tax et al.
4,388,948 A 6/1983 Carminati et al.

* cited by examiner

*Primary Examiner*—Kevin Lee
(74) *Attorney, Agent, or Firm*—Henry C. Query, Jr.

(57) ABSTRACT

The transfer device between a jib including at least one pipe section (54$a$, 54$b$) fixed to the jib (12) and a coupling, comprises a system of concertina or deformable diamond-shaped type articulated pipe segments and actuated by cable, at least one pipe section (24$a$, 24$b$) connecting to the coupling means. Each section fixed to the jib or connecting to the coupling is connected to one end of the system by a bend and rotary joints (53$a$, 53$b$), the bend being fixed to a support (51, 52) suspended from the jib. Each end of the system is fixed to a support (74$a$) movably mounted in rotation by a bearing (78$a$) on the bend support to which the end is connected, concentrically with the joint (72$a$) connecting the end to the bend. The invention applies in particular to the transfer of liquefied natural gas from a marine platform to an oil tanker.

10 Claims, 6 Drawing Sheets

ARTICULATED DEVICE FOR TRANSFERRING FLUID AND A LOADING CRANE INCLUDING SUCH A DEVICE

BACKGROUND OF THE INVENTION

The present invention relates in a general manner to fluid loading and/or unloading systems, in particular for vessels transporting such fluids. A preferred application area is the transfer of liquefied natural gas between a loading and/or unloading crane installed on the ocean bed and an oil tanker moored near this crane.

Examples of such loading and/or unloading systems are described in particular in the documents FR-A-2 469 367 and EP-0 020 267. These systems include a device for transferring fluid between a loading jib and a coupling means provided on the vessel. The transfer device comprises a system of multiple articulated segments of fluid pipe of concertina or deformable diamond-shape type actuated by cable, the ends of the system being respectively connected by means of bends and rotary joints to sections of pipe fixed to the jib and to the sections of pipe intended to be connected to the coupling means. At least some of these bends are fixed to a support suspended on the jib.

SUMMARY OF THE INVENTION

The present invention aims at improving certain aspects of this type of system.

According to a first aspect, the present invention proposes a device for transferring fluid between a loading jib having at least one pipe section fixed to the jib and a coupling means comprising a system of multiple articulated segments of fluid pipe of concertina or deformable diamond-shape type and actuated by cable, at least one pipe section intended to be connected to the coupling means, each pipe section fixed to the jib or intended to be connected to the coupling means being connected to one end of the system of articulated segments by means of a bend and rotary joints, the bend being fixed to a support suspended on the jib, which device is characterized in that each end of the system of articulated segments is fixed to a second support mounted movably in rotation by means of a bearing on the support of the bend onto which the end is connected, concentrically with the rotary joint connecting the end to the bend.

The use of two concentric rotations allows the functions of support and joining to be disassociated in rotation. Thus the rotary joints of the ends of the system of articulated segments are isolated from the forces acting on these segments. This is particularly useful when transferring liquefied natural gas because these rotary joints or rotations are then subjected to a temperature of −160° C. It is therefore necessary to limit the stress on these rotations. Such a mounting also enables balancing forces to be taken up directly on a structure for supporting articulated segments when this device for transferring fluid is provided with balancing systems.

The following are preferential conditions, possibly combined:

- the device for transferring fluid includes a structure for taking up the weight of the system of multiple articulated segments carrying each pipe section intended to be connected to the coupling means and movably mounted in rotation by means of at least one bearing on the first support carrying each bend connected to a pipe section intended to be connected to the coupling means, each bearing being concentrically arranged on the rotary joint connecting a pipe section intended to be connected by coupling means to a bend, which weight take-up structure includes a tapered centering piece adapted to cooperate with a complementary piece of the coupling means;
- the support carrying the connecting bend or bends to the section(s) of pipe fixed to the jib is suspended from the jib by means of struts, each of which is movably mounted in rotation, by means of a bearing on this support, concentrically with the connecting rotary joint (s) of the bend(s) on the pipe section(s) fixed to the jib.

Due to these conditions, none of the rotary joints situated on the upper and lower ends of the system of articulated segments are subjected to mechanical loads or stresses, in particular those connected to the mass of the system of articulated segments and to the accelerations to which these segments are subjected.

Because of the retraction phenomena produced during the transfer of liquefied natural gas, an annular free space preferably separates each associated rotary joint of the bearing, in the case of such an application.

In order to have access the fittings of the rotary joints, the support of the system end is advantageously equipped with a square-shaped piece, each end of the system of articulated pipe segments being fixed to one of the corresponding branches of a square-shaped piece and connected to the bend carried by the bend support by means of a supplementary bend fixed in a movable manner to this system end and connected to the bend of the bend support by a concentric rotary joint on a bearing connecting the other branch of the square-shaped piece to the bend support.

According to another original aspect within the scope of the present invention, the fluid transfer device is suspended from a jib pivotally tiltable on a jib support which is pivotally mounted in azimuth on a fixed base mounted on a platform, a first set of multiple pipe segments connects one part of the pipe carried by the jib to a pipe part fixed to the jib base and running to the bottom of the support and a second set of multiple pipe segments extends at the bottom the part of the pipe running along the support of the jib to the platform, the first and second sets of segments being configured and articulated to each other by means of rotary joints so as to permit the tilting movement of the jib on the jib support and the rotation of the jib support on its base, the pipe part running along the jib support as well as the first and second sets of segments being exterior to any substantially closed part of the support or the jib support.

Such conditions make it possible to avoid the installation of pipework inside an enclosed or badly ventilated space, which could have serious consequences in the case of an accidental leakage of liquefied gas.

In addition, it is possible to arrange the segments in the connection zone between the jib arid jib support such that they do not lead to the pipework rising which could prove detrimental to the circulation of fluid. In fact, such an arrangement facilitates in particular the drainage of fluid by gravity.

Moreover, all of the connection segments are easily accessible for maintenance.

More generally, such an arrangement of the connection segments between the jib and the jib support on the one hand and this jib support and the platform on the other are characterized by the simplicity of its design and consequently its low manufacturing and assembly costs, in particular for the crane.

According to another original aspect within the scope of the present invention, the fluid transfer device is suspended from a jib pivotally mounted and inclined on a jib support which is pivotally mounted in azimuth on a fixed support, the multiple articulated pipe segments form a series of two articulated diamonds the two respective angles of which are opposed at the vertex, the intermediate segments of pipe forming these two angles being joined together at their intersection by an articulation connected by a first set of cables and pulleys to a first set of free-balancing counterweights mounted movably in a longitudinal direction along the jib support whilst the support of the bends connecting the ends of the lower segments of the deformable diamonds to the pipe sections intended to be connected to the coupling means, is connected by a second set of cables to a second balancing counterweight controlled hydraulically and mounted movably in longitudinal direction on the jib support.

The implementation of two sets of balancing counterweights acting at different points on the structure of the multiple articulated segments allows the balancing forces intended to act on this structure to be adjusted precisely and, consequently, the loads, to which the rotary joints connecting the articulated segments to each other are subjected, to be limited in optimal fashion.

Such a balancing system also facilitates the connection of the fluid transfer device to the coupling means and the disconnection of the same transfer device.

To facilitate as much as possible the connection of the fluid transfer device to the coupling means, the pulling cable intended to allow this fluid transfer device to extend in order to connect it to the coupling means, is wound onto a winch mounted on the above-mentioned structure for the taking up of weight.

Advantageously, this winch, as well as the hydraulically controlled winch of the above-mentioned second set of balancing counterweights, are adapted to be controlled at a constant speed and a constant tension during the extension or retraction of the fluid transfer device.

By adjusting control of the winches, it is thus possible to ensure that the pulling cable is always taut, both during the phase of connection of the fluid transfer device to the coupling means and during the disconnection phase.

Consequently, it is possible to apply a maximum limit on the parasitic balancing phenomena of the fluid transfer device and to avoid impacts at the moment when the fluid transfer device comes into contact with the coupling means for the purpose of connecting them.

BRIEF DESCRIPTION OF THE DRAWINGS

The characteristics and advantages of the present invention will become apparent from the description which follows by way of example, with reference to the attached drawings, in which.

DETAILED DESCRIPTION OF THE PREFERRED EMBODIMENT

Figure 1:
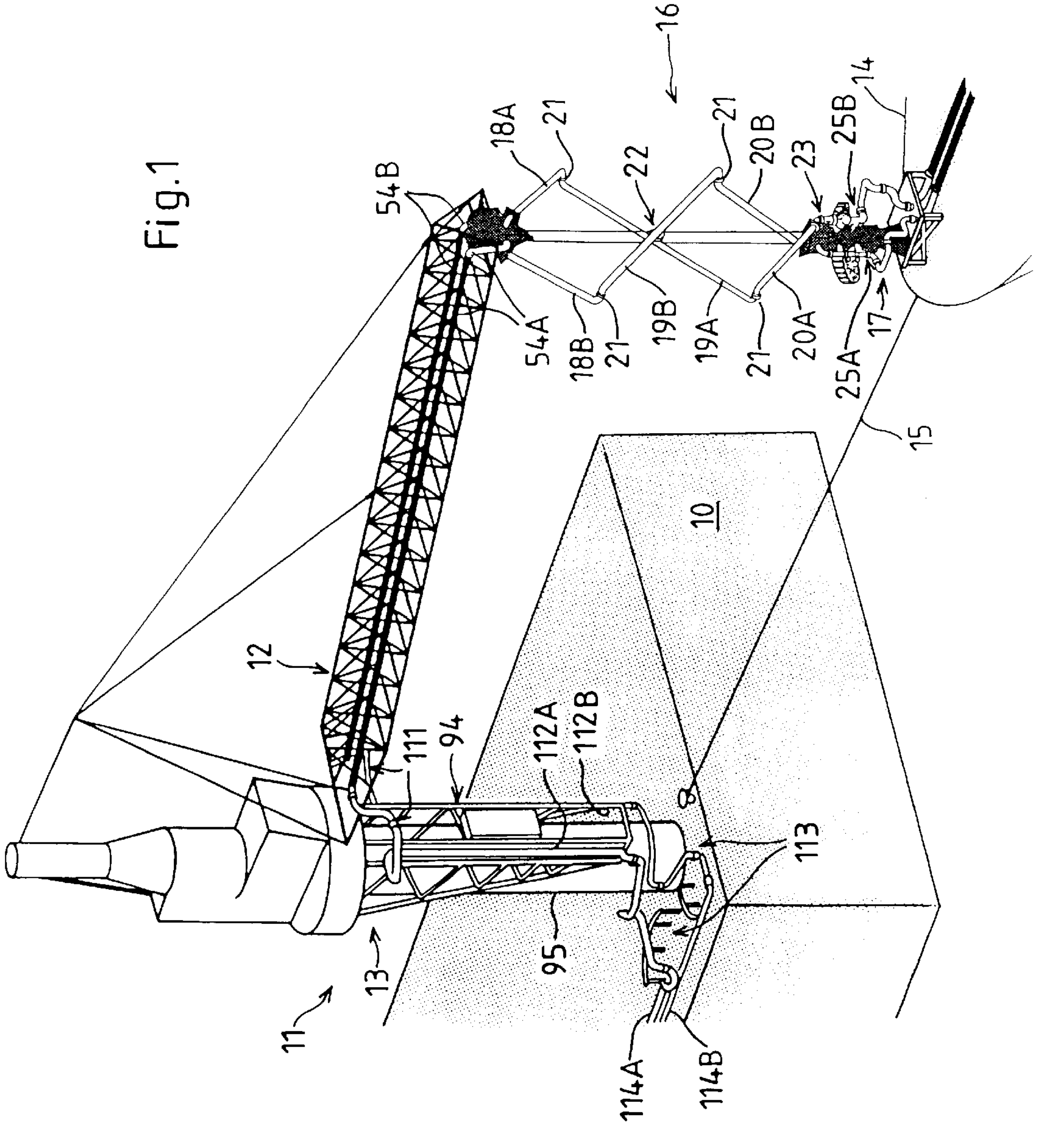
FIG. 1 is a perspective view representing a platform with a crane for transferring fluid and an oil tanker moored to the platform.

In FIG. 1, a part of a floating independent-production platform is shown. A transfer crane 11, comprising a jib 12 pivotally tiltable on a jib support 13, which is itself pivotally mounted in azimuth on a fixed support 95 mounted on the platform 10, is mounted on this part of the platform 10.

An oil tanker 14 is moored by means of a hawser 15 to the platform 10. A fluid transfer device 16 between the jib 12 and a coupling means 17 provided on the oil tanker 14 is suspended from this jib 12 and comprises a multiplicity of articulated pipe segments in deformable diamond-shapes actuated by cable.

More precisely, these deformable diamond-shapes form a double pantograph consisting of two upper half-branches 18*a*, 18*b*, two complete median branches 19*a*, 19*b* and two lower half-branches 20*a*, 20*b*. The half-branches 18*a*, 18*b* and 20*a*, 20*b* and the complete branches 19*a*, 19*b* are assembled with regard to each other in an articulated fashion by cryogenic rotary joints 21 of the Chicksan® joint type. This system of articulated pipe segments thus forms two pipe sections, one for transferring liquefied natural gas from the platform 10 to the oil tanker 14 and the other for returning vapor.

The complete branches 19*a*, 19*b* are immovably attached at their intersection by a ball joint 22.

A connecting head 23 intended to ensure the coupling of the double pantograph 16 to the coupling means 17 situated on the oil tanker 14 is suspended from the lower half-branches 20*a*, 20*b* with a Cardan joint.

Figure 4:
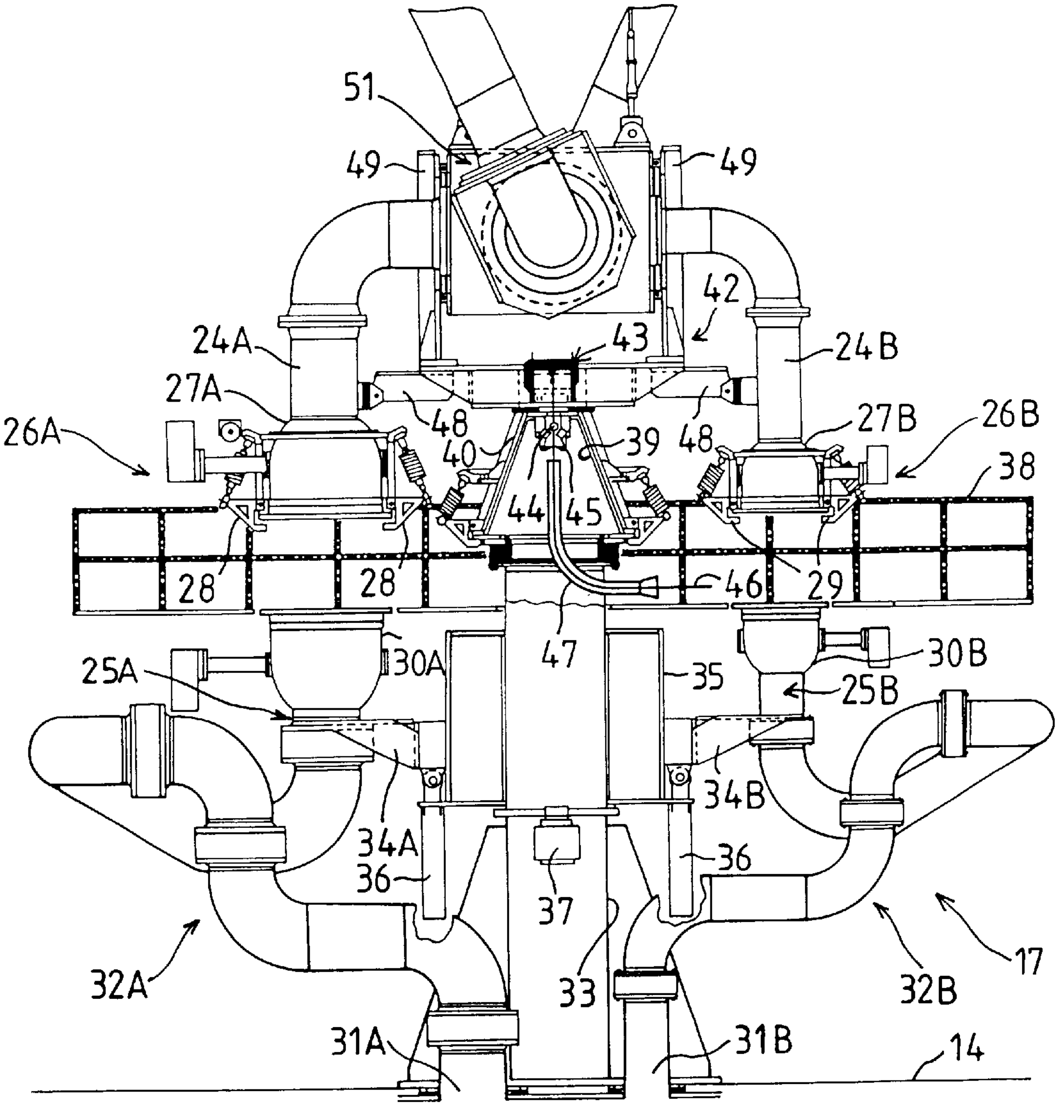
FIG. 4 is a front view with a partial cross-section representing the lower part of the fluid transfer device in connection phase to a coupling means situated on the oil tanker.

This connecting head 23 comprises coupling tubes 24*a*, 24*b* intended to be connected to corresponding tubes 25*a*, 25*b* of the coupling means 17 (see FIG. 4). One of the tubes, namely the pipe section 24*a*, is intended to transfer the liquefied gas, whilst the other pipe section 24*b* is intended to return the vapor from the oil tanker 14.

Each of these tubes 24*a*, 24*b* is provided, on one of its ends, with a rapid connection/disconnection element 26*a*, 26*b* equipped with a hemispherical plug valve 27*a*, 27*b* and clamping equipment 28, 29. These coupling elements 26*a*, 26*b* are intended to be clamped on complementary hemispherical plug valves 30*a*, 30*b* provided on the ends of the tubes 25*a*, 25*b* (see FIG. 4).

The safety equipment used here, in particular for emergency disconnection, is standard equipment and will therefore not be described in more detail here.

As can be seen in FIG. 4, each of the tubes or pipe sections 25*a*, 25*b* is connected by several other pipe sections and horizontal and vertical cryogenic rotary joints to pipe ends 31*a*, 31*b*, connecting these articulated pipe sections to tanks situated inside the oil tanker 14.

The pipe sections situated above the deck of the oil tanker 14 form two transfer lines or dog-legs 32*a*, 32*b* articulated around a central mast 33. The combination of rotations of each of the transfer lines 32*a*, 32*b* allows the hemispherical plug valves 30*a*, 30*b* to be positioned horizontally as well as displaced vertically with regard to their connection to the hemispherical plug valves 27*a*, 27*b* of the connecting head 23.

To this end, each of the tubes 25*a*, 25*b* is mounted on the end of a bracket 34*a*, 34*b* carried by a central sleeve 35 capable of rotating on the mast 33, jacks 36 activate the vertical movement of the brackets 34*a*, 34*b*.

A motor 37 also allows the sleeve 35 to turn on itself.

Thus it is possible to precisely connect the hemispherical plug valves 30*a*, 30*b* to the hemispherical plug valves 27*a*, 27*b* at the level of the access platform 38 of the oil tanker 14.

The top of the mast 33 is also provided with a tapered piece 39 adapted to receive a complementary tapered centering piece 40 mounted on the connecting head 23. Rapid fastening equipment 41 is also provided for clamping these two tapered pieces 39, 40 to each other.

The tapered piece 40 is mounted on the central branch of a U-shaped structure 42 described in more detail below. A winch 43 on which is wound a pulling cable intended to allow the double pantograph 16 to be extended in order to bring it into a connecting position with coupling means 17, is also mounted on the central branch of this structure 42. The free end of this pulling cable is provided with a cylindrical piece 44 (see FIG. 4), intended to be fastened to automatic fastening equipment 45 such as a clip housed on the inside of the tapered piece 39 of the coupling means 17. To bring it into this fastening position, the pulling cable is lengthened by a cable 46 intended to be introduced into a guide 47 on the side of the coupling means 17 in order to be able to subsequently bring the pulling cable into engagement with the fastening equipment 45.

The structure 42 carries the pipe sections 24*a*, 24*b* via a fixing device (of detachable type) of a rectilinear part of these pipes to the lateral fixing arms 48 integral with the structure 42.

In order to ensure a weight take-up of the double pantograph 16 at the moment of connection to the coupling means 17, the lateral branches 49 of the structure 42 are movably mounted in rotation by means of bearings 50 on a Cardan joint caisson 51 of the ends of the lower half-branches 20*a*, 20*b* and the pipe sections 24*a*, 24*b*.

The lower support structure of this caisson 51 and the connecting means of the pipe sections to it are similar to that and those of a caisson 52 which will be described in more detail later with reference to FIG. 4.

However, it should be noted that the pipe sections 24*a*, 24*b* each have a part bent at 90° at one end which is connected by means of a cryogenic rotary joint 53*a*, 53*b* to the end of a bend connected, by its other end, to one of the ends of the lower half-branches 20*a*, 20*b* similar to the connection of the ends of the upper half-branches 18*a*, 18*b* to the upper caisson 52 and to the corresponding bends.

It should also be noted that the bearings 50 are arranged concentrically on the rotary joints 53*a*, 53*b* with an annular free space between the two. The lateral branches 49 also surround the pipe sections 24*a*, 24*b* with a separation by an annular free space.

The upper half-branches 18*a*, 18*b* are also articulated on gimbals by means of an upper support caisson 52 on the pipe sections 54*a*, 54*b* fixed to the jib 12.

Figure 2:
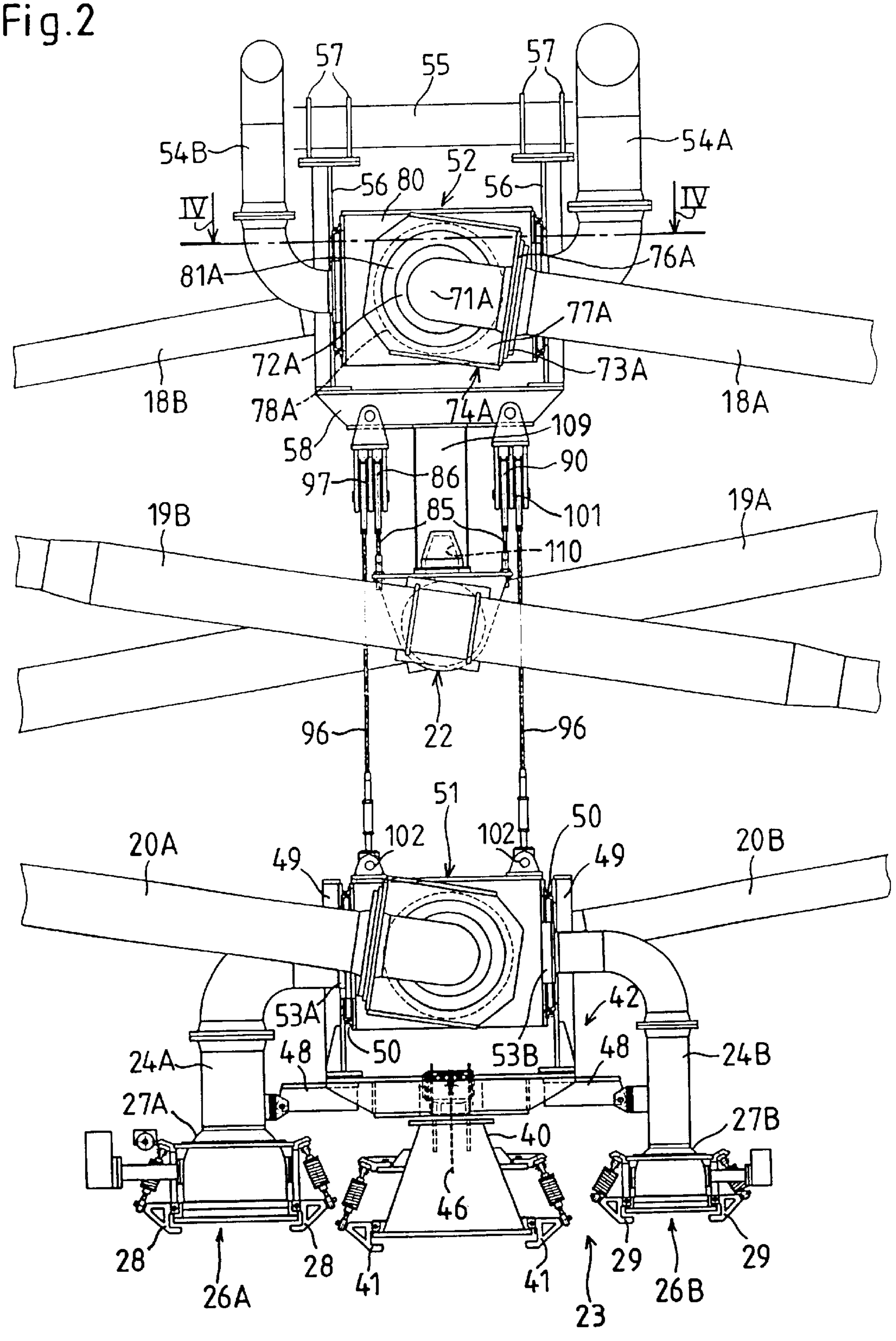
FIG. 2 is a partial front view of a fluid transfer device according to the invention.

The caisson 52 is itself also fixed to the jib 12 using two struts 56 suspended via lugs 57 to two parallel girders 55 of which only one is visible in FIG. 2.

Figure 3:
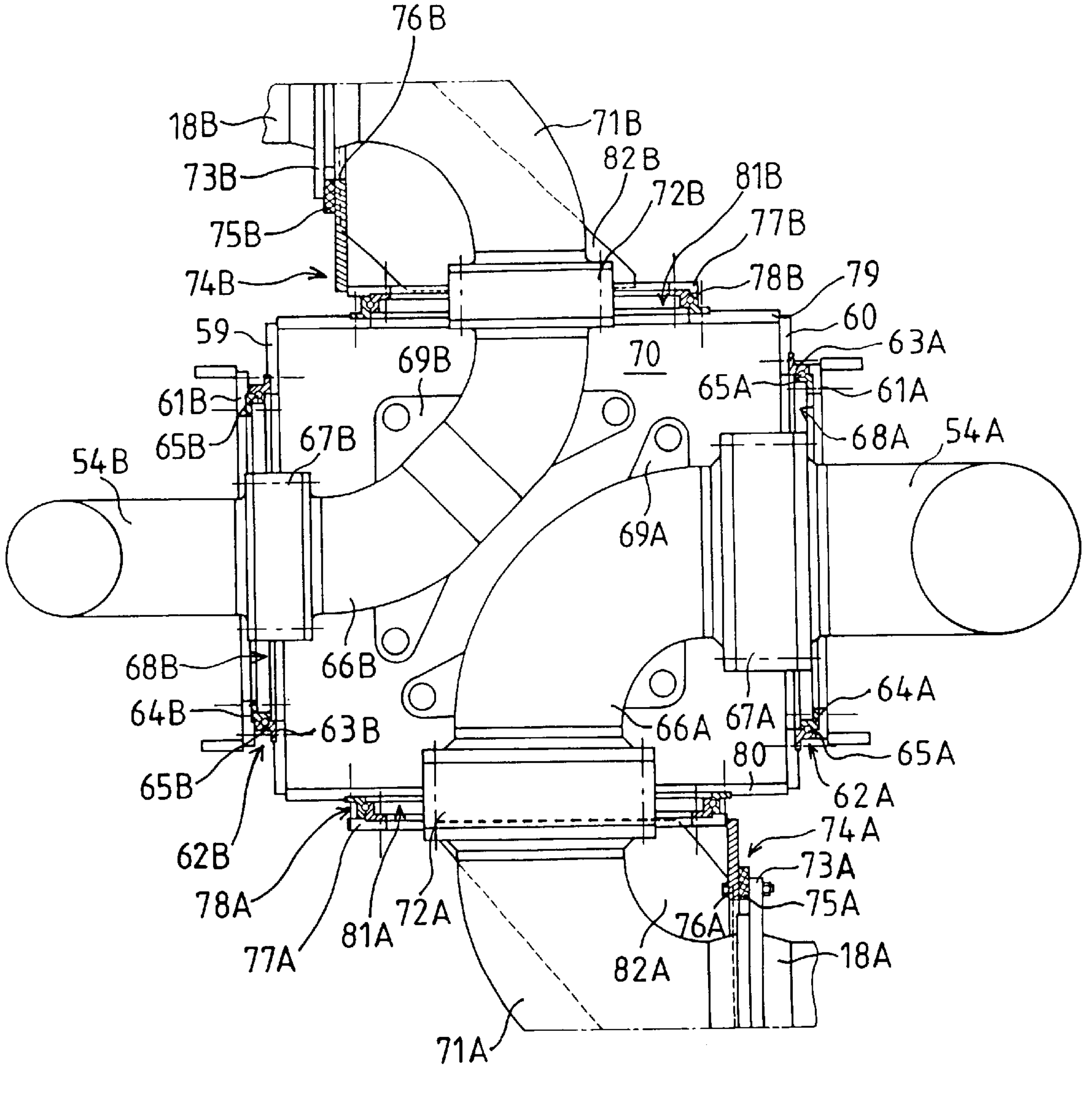
FIG. 3 is a partial cross-section view along line IV—IV of FIG. 2.

The ends of the struts 56 opposite the lugs 57 are connected to each other by means of a transverse girder 58. As can be better seen in FIG. 3, these struts 56 are also movably mounted in rotation on two opposite walls 59, 60 of the support caisson 52.

More precisely, these struts 56 are provided with a flange 61*a*, 61*b* movably mounted in rotation on the wall 59 or 60 by means of a bearing 62*a*, 62*b*.

This bearing 62*a*, 62*b* includes an external annular element 63*a*, 63*b* fixed to each of the walls 59, 60 and an internal annular element 64*a*, 64*b* fixed to each of the flanges 61*a*, 61*b*. The balls 65*a*, 65*b* are inserted between the external and internal annular elements of each of the bearings 62*a*, 62*b*.

Each of the sections 54*a*, 54*b* has a bent end part connected to an end of a bend 66*a*, 66*b* by means of a cryogenic rotary joint 67*a*, 67*b*.

The flanges 61*a*, 61*b*, the pulleys 62*a*, 62*b* and the walls 59, 60 are separated from the rotary joints 67*a*, 67*b* and the pipe sections 54*a*, 54*b* by an annular free space 68*a*, 68*b*.

The bends 66*a*, 66*b* are fixed by means of flanges 69*a*, 69*b* to a solid base plate 70 integral with the lateral walls of the caisson 52 and perpendicular to these.

Each of the other ends of the bends 66*a*, 66*b* is connected to an end of one of the upper half-branches 18*a*, 18*b* of the double pantograph 16 by means of a detachable 90° bend 71*a*, 71*b*.

One of the ends of the bends 71*a*, 71*b* is connected to the end of the bends 66*a*, 66*b* by means of a cryogenic rotary joint 72*a*, 72*b* whilst the other end is fixed to an end of the upper half-branch 18*a*, 18*b*.

To do this, this end of half-branch 18*a*, 18*b* is provided with a flange 73*a*, 73*b* bolted onto a branch of a square-shaped piece 74*a*, 74*b* with the insertion of an isolation fitting 75*a*, 75*b*. Each of these branches 76*a*, 76*b* is shaped like a plate provided with a central opening for the passage of the bend 71*a*, 71*b*.

The other branch 77*a*, 77*b* of the square-shaped pieces 74*a*, 74*b* is also shaped like a plate surrounding a corresponding rotary joint 72*a*, 72*b* with an annular free space between the two. These branches 77*a*, 77*b* are, moreover, movably mounted in rotation by means of a ball bearing 78*a*, 78*b* on parallel walls 79, 80 of the caisson 52 perpendicular to the walls 59 and 60.

The mounting by means of bearings 78*a*, 78*b* of the branches 77*a*, 77*b* on the walls 79, 80 being similar to the mounting of the flanges 61*a*, 61*b* on the walls 59, 60, it will not be described in more detail here.

However, it should be noted that the bearings 78*a*, 78*b* are arranged concentrically around the corresponding cryogenic rotary joints 72*a*, 72*b*. Moreover, the plate-shaped branches 77*a*, 77*b* are provided with a central opening which forms an annular free space 81*a*, 81*b* with the pulley 78*a*, 78*b* between the rotary joints 72*a*, 72*b* and the means of mounting the branches 77*a*, 77*b* in rotation on the walls 79, 80.

In addition, the respective branches of the square-shaped pieces 74*a*, 74*b* are reinforced by the gussets 82*a*, 82*b*.

The square-shaped pieces 74*a*, 74*b* are thus in form of a stress take-up bracket.

It will be appreciated that the rotary joints of the Cardan joints on the upper and lower ends of the double pantograph 16 are thus no longer subjected to the mechanical loads or stresses (pantograph weight, accelerations, etc).

Moreover, this design also allows balancing forces to be taken up directly on the support structures of the double pantograph 16 as will be seen later on.

It will also be noted that this fluid transfer device 16 is deformable in its principal plane in order to move its articulated pipe segments up or down.

As for the articulation of the half-branches and complete branches with respect to each other by the rotary joints it is standard and can for example be carried out in the manner described in the above-mentioned document FR-2 469 367.

In addition, this device 16 can rotate in its principal plane around the articulation axes of the joints 72*a*, 72*b* and bearings 78*a*, 78*b*. Finally, the fluid transfer device 16 can also rotate perpendicular to its principal plane around the articulation axes of the joints 67*a*, 67*b* and of the bearings 62*a*, 62*b*.

Figure 5:
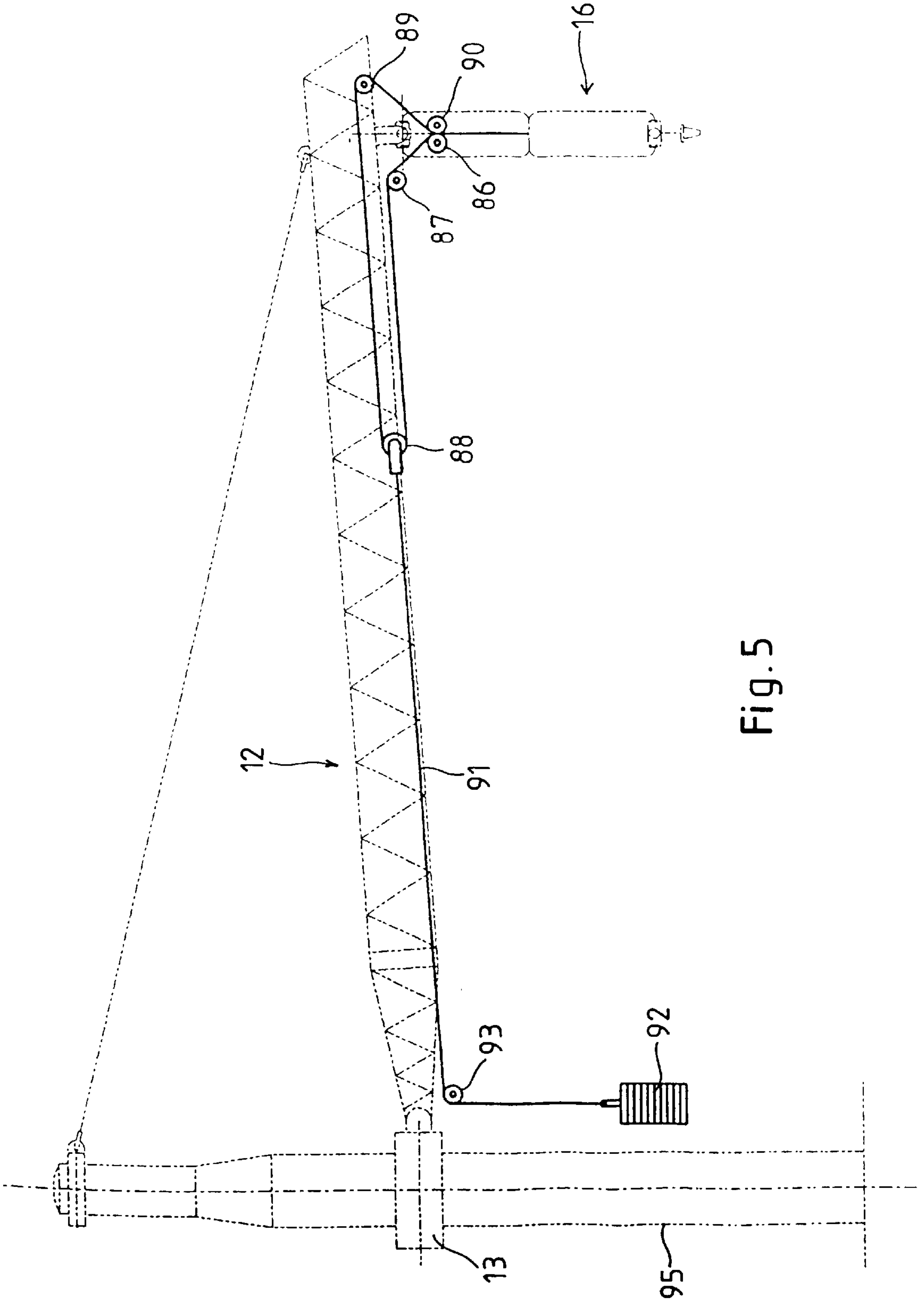
FIG. 5 is a very schematic view of the transfer crane on which the balancing system of free counterweights has been shown.
Figure 6:
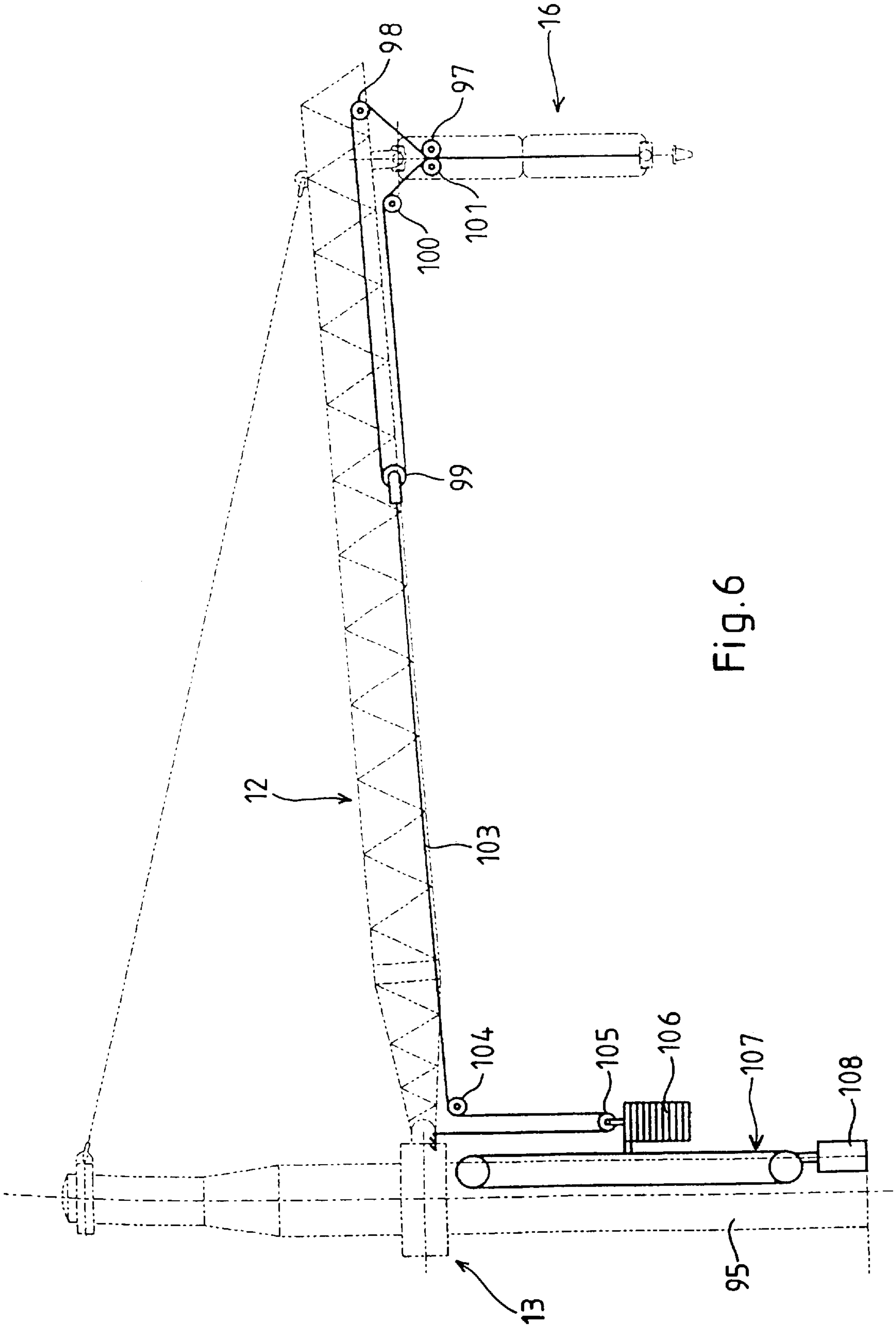
FIG. 6 is a similar view to FIG. 5 showing the balancing system of hydraulically-controlled counterweights.

In FIGS. 5 and 6, two balancing systems of this transfer device 16 with double pantograph can be recognized, one connected to the central point (articulation 22) of this double pantograph and the other connected to the low point (caisson 51) of this same double pantograph 16.

The first balancing system comprises a first cable 85 which goes from articulation 22 and passes over a first return pulley 86 of a pulley holder pivotably mounted on the girder 58, then over a second return pulley 87 fixed on the jib 12, a third 180° return pulley 88 as well as a fourth return pulley fixed in front of the jib 12, to return over a return pulley 90 of a second pulley holder pivotably mounted on the girder 58 and ending finally at the articulation 22 again.

A connection cable 91 is connected by one of its ends to the pulley holders of the return pulley 88 and by its other end to a set of balancing counterweights 92 by passing over a 90° return pulley 93 fixed to the jib 12.

This set of counterweights 92 moves freely inside a guiding structure 94 of the jib support 13 revolving around the fixed support 95 (see FIG. 1).

The second balancing system comprises a cable 96 passing over a second return pulley 97 of the first pulley holder, over a second return pulley 98 fixed at the front of the jib 12 substantially at the same location as the return pulley 89. Then, the cable passes over another 180° return pulley 99 situated between the two longitudinal ends of the jib 12, approximately at the same location as the pulley 88.

The cable 96 then returns via an additional return pulley 100 fixed to the jib 12 between the return pulleys 98 and 99 and substantially at the same location as the pulley 87 and via a second pulley 101 of the second pulley holder to the caisson 51.

It should be noted in this respect that the two ends of the cable 96 are fixed to the caisson 51 with the possibility of angular deflection in the principal plane of the double pantograph 16, for example by means of a fork articulation 102.

As can be seen again in FIG. 2, the pivoting axes of the fork articulations 102 thus extend perpendicular to the principal plane of the double diamond 16 just like the pivoting axes of the first and second pulley supports.

Another connection cable 103 is connected by one of its ends to the pulley holder of the pulley 99, then passes over a 90° return pulley 104 fixed to the jib 12 before arriving at a 180° return pulley 105 fixed to a second set of balancing counterweights 106. Finally, the cable 103 rises towards the jib 12 where it is fixed to the support structure 13 of the jib 12.

This second set of counterweights 106 also slides inside the guiding structure 94, but is controlled in translation by an actioning system 107 comprising a hydraulic winch 108.

It can also be seen in FIGS. 2, 5 and 6 that the cables 85 and 96 extend below the first and second pulley holders in the principal plane of the double diamond 16 and above these pulley holders, in the planes perpendicular to this principal plane so as not to hinder the extension and retraction maneuvers of the fluid transfer device 16.

In FIG. 2, it can be seen again that the fluid transfer device 16 is provided with a clamping device in the retracted position of the double diamond 16. This device has a male element 109 fixed to the girder 58 and a female element 1 10 fixed on the top of the articulation 22. This female element 110 has a complementary shape to a recess provided on the male element 109 and penetrates into this in the retracted position for clamping the double diamond 16 in the retracted position.

It will also be appreciated that the balancing counterweights 92 and 106 are easily accessible and connected by cables and pulleys which are always aligned with the structure of the crane 11.

It will also be appreciated that the counterweight system 92 allows a constant balancing of the center of the double pantograph 16 to be ensured whereas the counterweight system 106 allows a variable tension to be applied. Thus, while the fluid transfer device 16 is in use, it is possible to compensate for all relative movements between the oil tanker 14 and platform 10.

Moreover, the speed of displacement of the double pantograph 16 can be controlled with precision both during a normal disconnection during which the articulated segments are empty and during an emergency disconnection in the course of which the articulated segments are full of products and covered with ice.

More generally, these two systems allow the stresses on the intermediate rotary joints of the double pantograph 16 to be minimized and the loads applied to the coupling means 17 during the connection of the double pantograph 16 to the coupling means to be reduced, but also enables to execute a connection without impact.

Of course, the connecting head 23 and the coupling means 17, owing to their structures, also contribute to this connection without collision and to a compensation of the relative movements between the oil tanker 14 and the platform 10.

In this respect, it should be noted that the winches 43 and 108 are adapted to be controlled at a constant speed or constant tension so as to be able to compensate for these relative movements between the oil tanker 14 and the platform 10.

Thus, at the beginning of the extension of the double pantograph 16 after attaching the pulling cable to the coupling means 17, this cable is pulled at a constant speed with respect to the jib 12 and a constant tension with respect to the coupling means 17, by actuating the winch 108 at a constant speed and the winch 43 at a constant force. This allows any risk of collision between the double pantograph 16 and the jib 12 to be avoided.

Then, in an intermediate phase, the two winches are actuated at a constant force.

Subsequently, when the double pantograph 16 arrives in the vicinity of the mechanical connection point to the coupling means 17, the constant speed of the cable is thus defined as a constant speed with respect to the coupling means 17 whilst it is pulled at a constant tension with respect to the jib 12 in the opposite direction. In other words, the winch 43 is actuated at a constant speed whilst the winch 108 is actuated at a constant force. It is thus possible to limit the risk of collision between the connecting head 23 and the tapered piece 39 of the coupling means 17.

In reverse (disconnection), the winch 43 is first actuated at a constant speed and the winch 108 at a constant force. Then, during an intermediate stage, the two winches are actuated at a constant force and, finally, in the vicinity of the retracted position near the jib 12, the winch 43 is actuated at a constant force whilst the winch 108 is actuated at a constant speed.

Due to these conditions, the double pantograph 16 can be brought into position to connect with the coupling means 17 and to be disconnected from this in optimal manner.

It should be noted in this respect that position detectors and strain gauges are connected to a control system for the winches 43 and 108.

At the platform 10 end, the jib 12 is pivotably tiltable on the jib support 13 by about 10° with regard to its horizontal position. The jib support 13 is capable of executing a rotation of 250° around the support 95.

In order to make the inclination movement possible, two sets 111 of the multiple pipe segments articulated to each other by means of rotary joints connect the pipe sections 54*a* and 54*b* connected to the double pantograph 16 and running along the jib 12 to pipe sections 112*a*, 112*b* carried by the support structure 13 of the jib 12 and along the outside of the support 95.

Similarly, two sets 113 of other pipe segments articulated to each other by means of rotary joints connect these pipe sections 112*a* and 112*b* to the tubes 114*a* and 114*b* fixed to the platform 10 and serving, respectively, to supply the liquefied natural gas and to recover vaporized gas.

These pipe segment sets 111 and 113 are of course articulated to each other by means of rotary joints which allow the tilting movement of the jib 12 on its support 13 and the rotation of this support 13 around the base 95.

It will be appreciated that these pipe segments 111 and 113, as well as the pipe sections 112*a* and 112*b* are all exterior to any closed structure of the crane 11 such as the base 95. This has the advantages mentioned above. In addition, the sets of articulated segments 111 and 113 also allow for the expansion and retraction of tubes.

It is understood that the preceding description was proposed only by way of an example and equivalent constitutive elements can be used without thereby departing from the scope of the invention.

What is claimed is:

1. A fluid transfer device between a loading jib including at least one pipe section fixed to the jib and a coupling means, the device comprising a system of multiple articulated fluid pipe segments forming an accordion structure or one or more deformable lozenges and being actuated by at least one cable; and at least one pipe section for connecting the system to the coupling means; and wherein the at least one pipe section fixed to the jib and the at least one pipe section for connecting the system to the coupling means are connected to an upper pipe end and a lower pipe end of the system, respectively, by means of a bend and rotary joints, each bend being fixed to a support suspended from the jib and each pipe end of the system being fixed to a support which is rotatably mounted by means of a bearing on the support of the bend to which the pipe end is connected, the bearing being concentrically arranged around the rotary joint connecting the pipe end to the bend.

2. The device according to claim 1, further comprising a weight take-up structure for taking up the weight of the system and carrying the at least one pipe section for connecting the system to the coupling means, the weight take-up structure being rotatably mounted by means of at least one structure bearing on the support carrying the bend or each of the bends connected to a pipe section for connecting the system to the coupling means, the at least one structure bearing being concentrically arranged around a rotary joint connecting a bend to the at least one pipe section for connecting the system to the coupling means, which weight take-up structure includes a centering tapered piece adapted to co-operate with a complementary piece of the coupling means.

3. The device according to claim 2, wherein the support carrying the bend connected to the at least one pipe section fixed to the loading jib is suspended from the jib by means of struts, each one of which is rotatably mounted by means of a strut bearing on this support, at least one of the strut bearings being concentrically arranged around a rotary joint connecting a bend to a pipe section fixed to the jib.

4. The device according to claim 1, wherein an annular free space separates each rotary joint from the bearing concentric thereto.

5. The device according to claim 1, wherein each pipe support is equipped with a square-shaped piece, each pipe end of the system being fixed to one of the branches of a corresponding square-shaped piece and connected to the bend carried by the bend support by means of a supplementary bend fixed in detachable manner to this end of the system and connected to the bend of the bend support by a rotary joint which is arranged concentrically around a bearing connecting the other branch of the square-shaped piece to the bend support.

6. The device according to claim 1, which is suspended from a jib pivotably tiltable on a jib support which is pivotably mounted in azimuth on a fixed base mounted on a platform, a first set of multiple fluid pipe segments connecting a pipe part carried by the jib to a pipe part fixed to the jib support and running to the bottom of the base and a second set of multiple fluid pipe segments extending from the bottom of the pipe part running along the jib support to the platform, the first and second sets of segments being configured and articulated to each other by means of rotary joints so as to allow the tilting movement of the jib on the jib support and the rotation of the jib support on its base, the pipe part running along the jib support as well as the first and second sets of segments being external to any substantially closed part of the base or jib support.

7. The device according to claim 3, which is suspended from a jib which is pivotably tiltable on a jib support which is pivotably mounted in azimuth on a fixed base, and wherein the system of multiple articulated fluid pipe segments forms a series of two deformable lozenges, two respective angles of which are opposed at the vertex, the intermediate pipe sections forming these two angles being joined together at their intersection by an articulation connected by a first set of cables and pulleys to a first set of free-balancing counterweights mounted movably longitudinally along the jib support whilst the support of the bends connecting the ends of the lower segments of the deformable lozenges to the pipe sections for connecting the system to the coupling means, is connected by a second set of cables and pulleys to a second set of balancing counterweights controlled hydraulically and movably mounted longitudinally on the jib support.

8. The device according to claim 7, wherein each set of cables passes over return pulleys pivotably mounted to a transverse girder fixed to the struts.

9. The device according to claim 8, wherein a winch, on which is wound a pulling cable for stretching out the fluid transfer device to bring the device into position for connection with the coupling means, is mounted on the weight take-up structure.

10. The device according to claim 9, wherein the second set of balancing counterweights is controlled hydraulically using another winch, the two winches being adapted to be controlled at a constant speed and constant tension during the stretching and retraction of the fluid transfer device.

* * * * *